(12) United States Patent
Delavaux et al.

(10) Patent No.: US 11,509,108 B2
(45) Date of Patent: Nov. 22, 2022

(54) TM-DOPED FIBER AMPLIFIER UTILIZING WAVELENGTH CONDITIONING FOR BROADBAND PERFORMANCE

(71) Applicant: Cybel, LLC., Bethlehem, PA (US)

(72) Inventors: Jean-Marc Delavaux, Pittstown, NJ (US); Robert E. Tench, Allentown, PA (US); Alexandre Amavigan, Whitehall, PA (US)

(73) Assignee: Cybel, LLC., Bethlehem, PA (US)

( * ) Notice: Subject to any disclaimer, the term of this patent is extended or adjusted under 35 U.S.C. 154(b) by 285 days.

(21) Appl. No.: 16/864,528

(22) Filed: May 1, 2020

(65) Prior Publication Data
US 2021/0344161 A1 Nov. 4, 2021

(51) Int. Cl.
| | | |
|---|---|---|
| H01S 3/00 | (2006.01) |
| H01S 3/067 | (2006.01) |
| H01S 3/10 | (2006.01) |
| H01S 3/094 | (2006.01) |
| H01S 3/0941 | (2006.01) |
| H01S 3/16 | (2006.01) |

(52) U.S. Cl.
CPC ...... *H01S 3/06758* (2013.01); *H01S 3/06708* (2013.01); *H01S 3/0941* (2013.01); *H01S 3/094003* (2013.01); *H01S 3/1003* (2013.01); *H01S 3/1616* (2013.01)

(58) Field of Classification Search
CPC .......... H01S 3/1003; H01S 3/10023; H01S 3/06758; H01S 3/06708; H01S 3/094003; H01S 3/0941; H01S 3/1616
See application file for complete search history.

(56) References Cited

U.S. PATENT DOCUMENTS

| | | | |
|---|---|---|---|
| 5,541,766 A * | 7/1996 | Mizrahi | H01S 3/10023 359/337 |
| 6,407,853 B1 | 6/2002 | Samson et al. | |
| 6,476,960 B1 | 11/2002 | Traynor et al. | |
| 7,113,328 B2 | 9/2006 | Gomes et al. | |
| 7,298,547 B1 | 11/2007 | Jiang et al. | |
| 7,313,306 B2 | 12/2007 | Yamada et al. | |
| 9,042,007 B1 * | 5/2015 | Qiao | H01S 3/06758 359/341.32 |

(Continued)

FOREIGN PATENT DOCUMENTS

| | | | | |
|---|---|---|---|---|
| CN | 105514774 A | * | 4/2016 | .......... H01S 3/0675 |
| CN | 107193171 B | * | 12/2020 | ......... H04B 10/2971 |
| WO | WO 2017044799 A1 | * | 3/2017 | ....... H01S 3/094023 |

*Primary Examiner* — Mark Hellner
(74) *Attorney, Agent, or Firm* — Wendy W. Koba

(57) ABSTRACT

A multi-stage thulium-doped (Tm-doped) fiber amplifiers (TDFA) is based on the use of single-clad Tm-doped optical fiber and includes a wavelength conditioning element to compensate for the nonuniform spectral response of the initial stage(s) prior to providing power boosting in the output stage. The wavelength conditioning element, which may comprise a gain shaping filter, exhibits a wavelength-dependent response that flattens the gain profile and output power distribution of the amplified signal prior to reaching the output stage of the multi-stage TDFA. The inclusion of the wavelength conditioning element allows the operating bandwidth of the amplifier to be extended so as to encompass a large portion of the eye-safe 2 μm wavelength region.

20 Claims, 6 Drawing Sheets

(56) References Cited

U.S. PATENT DOCUMENTS

| | | |
|---|---|---|
| 9,112,329 B2 | 8/2015 | Fan |
| 9,466,939 B2 | 10/2016 | Moulton et al. |
| 9,684,077 B2 | 6/2017 | Mead et al. |
| 2006/0268394 A1* | 11/2006 | Sommer ............. H01S 3/06754 359/337.5 |
| 2009/0052015 A1* | 2/2009 | Wang .................... H01S 3/0014 359/337.1 |
| 2017/0123148 A1* | 5/2017 | Jiang .................. G02B 6/02019 |

* cited by examiner

10A

10B

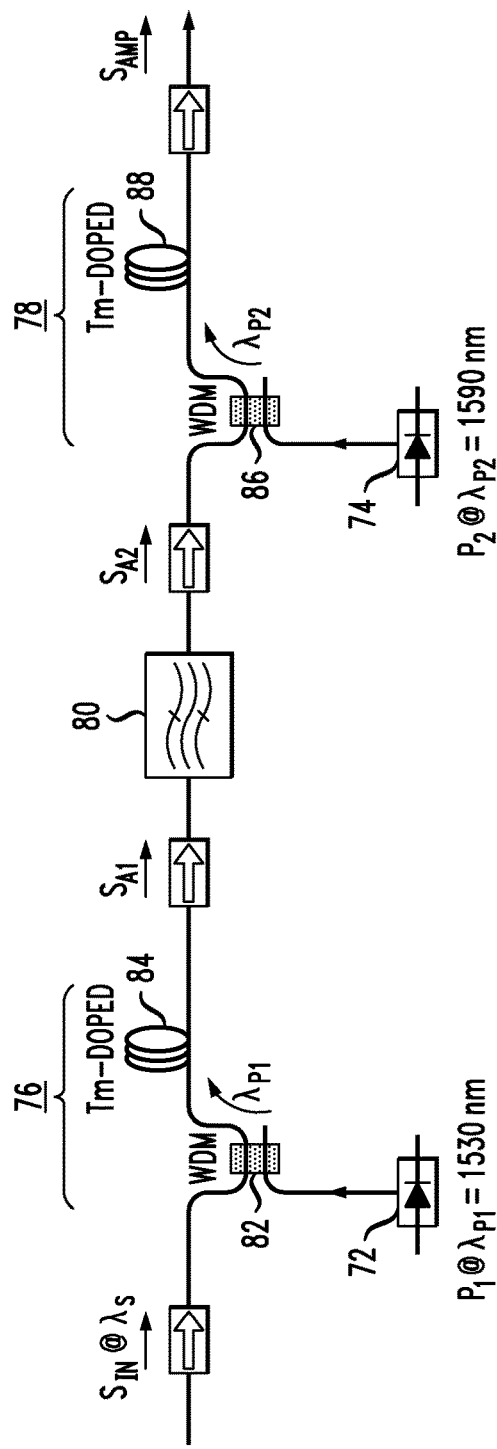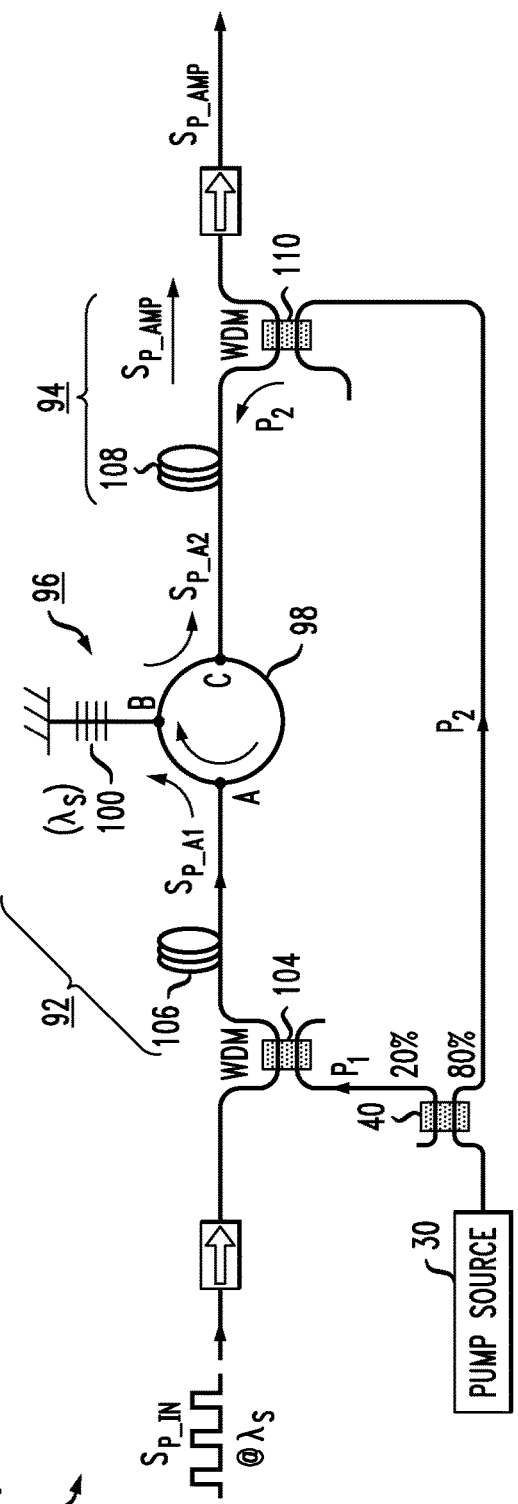

120

150

TM-DOPED FIBER AMPLIFIER UTILIZING WAVELENGTH CONDITIONING FOR BROADBAND PERFORMANCE

GOVERNMENT RIGHTS IN INVENTION

This invention was made with government support under NASA SBIR Phase I Contract No. 80NSSC19C0278. The government has certain rights in the invention.

TECHNICAL FIELD

The present invention relates to thulium-doped (Tm-doped) fiber amplifiers and, more particularly, to the utilization of post-amplification wavelength conditioning to improve the uniformity of signal gain and output power over an operating bandwidth of the amplifier.

BACKGROUND OF THE INVENTION

There is a continuing need to develop optical systems that are capable of operating in the eye-safe 1.90-2.15 µm wavelength range. Applications such as LIDAR, atmospheric sensing (e.g., $CO_2$), WDM communication systems, and the like, are among those that will need to rely on high performance optical devices that operate within this 2 µm wavelength region. To date, multiwatt Tm-doped fiber amplifiers (TDFAs) have been one option for providing signal gain in this 2 µm wavelength band. In most cases, the TDFAs are based upon the use of a double-clad (or triple-clad) gain fiber, where the multiple cladding layers not only result in a fiber coil of relatively large size, but also have particular coupling/connection requirements to input and output fibers.

While some initial TDFA designs have been able to provide amplification at several selected wavelengths within the 2 µm region, the overall spectral response of these amplifiers have exhibited a limited useful bandwidth (as typically defined by the 3 dB points in the output power spectrum). The gain profile for these TDFAs is similarly nonuniform as a function of wavelength, which is a concern for applications requiring the use of multiple optical signals operating at different wavelengths for applications such as sensing and communication.

Thus, a need remains for an optical amplifier that provides an essentially uniform gain profile and output power distribution over an extended portion of the eye-safe 1.90-2.15 µm wavelength band.

SUMMARY OF THE INVENTION

The needs remaining in the prior art are addressed by the present invention, which relates to thulium-doped (Tm-doped) fiber amplifiers (TDFAs) and, more particularly, to the incorporation of wavelength conditioning elements to compensate for the nonuniform wavelength or spectral response of the Tm-doped gain fiber, extending the usable bandwidth over a larger portion of the 2 µm wavelength region.

In accordance with the principles of the present invention, a wavelength conditioning element is disposed beyond the output of a Tm-doped fiber amplifier (TDFA) and configured to exhibit a wavelength-dependent response that flattens the gain profile and output power distribution of the amplified output signal, where the inclusion of the wavelength conditioning element allows operating bandwidth of the amplifier to be extended (by greater than 100 nm in most cases) so as to encompass a larger portion of the eye-safe 2 µm wavelength region.

Various embodiments of the present invention may utilize a gain-shaping filter as the wavelength-conditioning element, with the spectral shape of the filter configured to compensate for variations in gain and output power typically evident at the low and high wavelength end regions of the amplifier's spectral bandwidth. The gain-shaping filter itself may be formed of any suitable component, including discrete devices (such as thin-film dielectric filters) or fiber-based, in-line elements. The latter may include in-line components such as wideband fiber Bragg gratings (FBGs), "unpumped" sections of Tm-doped optical fiber, or other types of optical fiber. In operation, the gain-shaping filter may be configured to exhibit a fixed response or a variable (adjustable) response. Examples of adaptable or dynamic filters include, but are not limited to, wavelength acousto-optic filters, MEMs devices, liquid crystal arrangements, electro-optic $LiNbO_3$ filters, and similar tunable devices.

Other types of wavelength conditioning elements may be utilized, such as a narrowband FBG in combination with an optical circulator. In systems using the TDFA to amplify a pulsed signal, there is an additional need to control the responsivity of the wavelength conditioning element. A circulator may be disposed at the amplifier output, passing the amplified signal through a reflective, extremely narrow-band FBG to remove as much amplified spontaneous emission (ASE) as possible before re-introducing the amplified pulsed signal onto the output path.

The inclusion of wavelength conditioning is particularly beneficial when used as part of a multi-stage TDFA. In particular, the wavelength conditioning element is preferably disposed beyond the output of a preamplifier stage, prior to introducing the signal to a power boosting stage. The ability to flatten and extend the wavelength response of the preamplifier allows for the boosting stage to introduce gain over a wider bandwidth, while also maintaining an acceptable optical signal-to-noise ratio (OSNR).

The amplifier elements may be formed of either standard single mode optical fiber (i.e., non-polarization-maintaining), or fiber of polarization-maintaining construction. For applications that operate with a single polarization signal, polarization-maintaining fiber is preferably used to form the complete signal path from the input to the output of a multi-stage TDFA in order to maintain the orientation of the propagating signal along a designated axis without the need for additional polarization controlling elements.

An exemplary embodiment of the present invention takes the form of a multi-stage optical amplifier for operation at an eye-safe input optical signal wavelength $\lambda_S$ within the 2 µm wavelength region is based on a plurality of N sections of single-clad Tm-doped optical fiber disposed in a concatenated configuration, each section defining a separate stage of the multi-stage optical amplifier. This embodiment also includes pump source for providing a pump beam to each separate amplifier stage of the multi-stage optical amplifier and a wavelength conditioning element disposed along a signal path at an input to the last, output amplifier stage of the multi-stage optical amplifier. The wavelength conditioning element is responsive to an intermediate amplified optical signal and configured to normalize a gain profile and an output power density of the intermediate amplifier signal across a predetermined wavelength region, increasing an operating bandwidth of the intermediate amplified optical signal prior to propagating through the last, output amplifier stage of the multi-stage optical amplifier.

Other and further aspects and embodiments of the present invention will become apparent during the course of the following discussion and by reference to the accompanying drawings.

BRIEF DESCRIPTION OF THE DRAWINGS

Turning now to the drawings, where like numerals represent like parts in several views:

FIG. 6 illustrates an alternative configuration of the embodiment of FIG. 5, in this case using separate, discrete pump sources for each amplifier stage of the multi-stage TDFA;

FIG. 7 illustrates an exemplary multi-stage TDFA that is particularly configured to provide amplification and wavelength conditioning for a pulsed input signal;

DETAILED DESCRIPTION

Recent developments in various types of optical-based applications have created the need for optical systems that operate in the eye-safe wavelength band of 1.9-2.1 µm. One need is for an optical amplifier that is able to impart an appreciable level of gain to input signals across a relatively wide wavelength region within this eye-safe band. Most applications require an amplifier that provides a uniform (i.e., "flat") gain profile and output power distribution over the wavelength range of interest.

Figure 1:
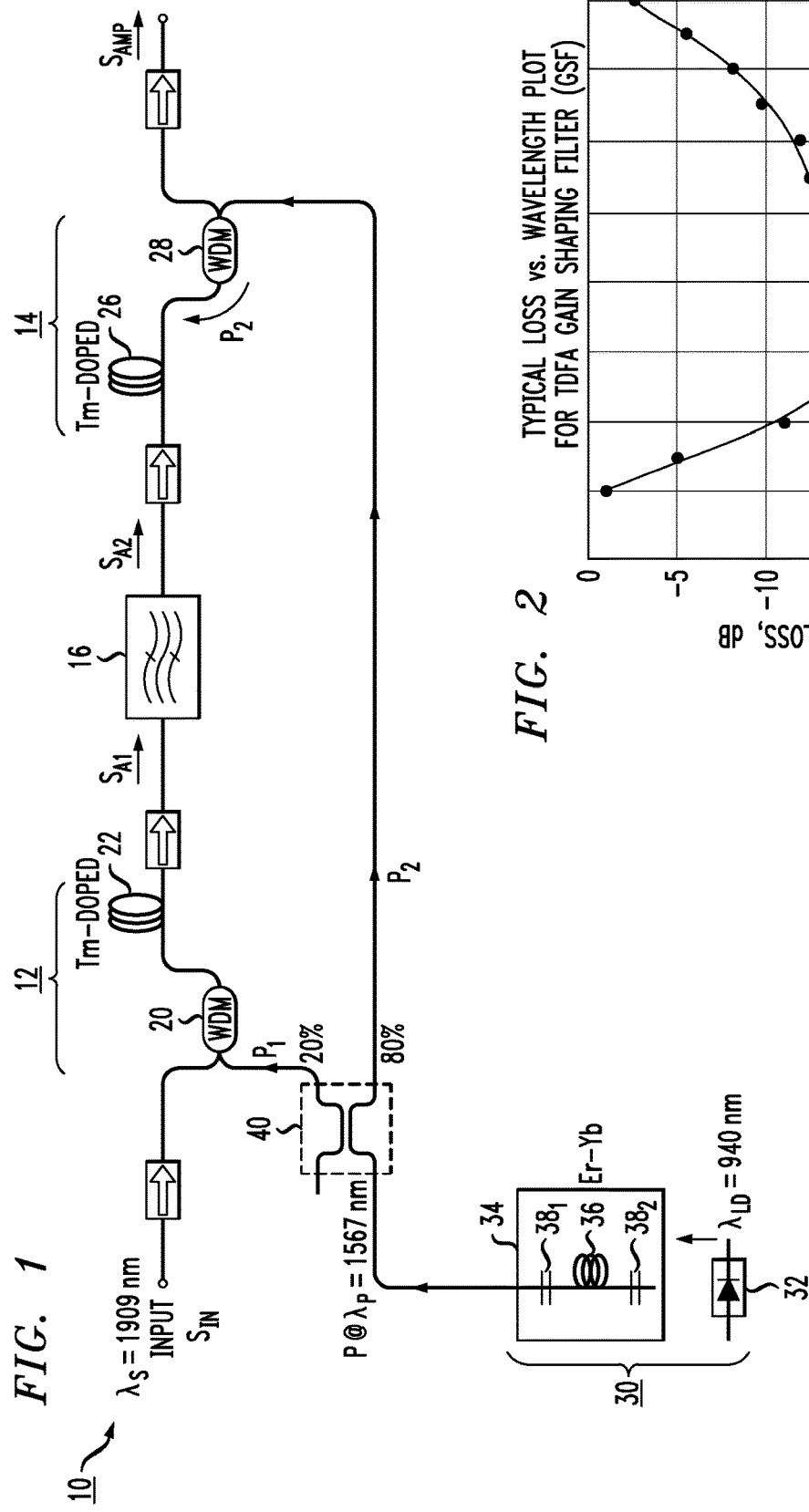
FIG. 1 contains a block diagram of an exemplary Tm-doped fiber amplifier (TDFA) formed in accordance with the principles of the present invention, including a wavelength conditioning element to improve the operating bandwidth of the amplifier.

FIG. 1 contains a block diagram of an exemplary Tm-doped fiber amplifier (TDFA) 10 formed in accordance with the principles of the present invention. TDFA 10 is based upon the use of single-clad optical gain fiber in combination with a wavelength conditioning element that is configured to reduce nonuniform gain/emission in the spectral response of the amplifier (i.e., to flatten the gain profile and output power distribution of the amplifier). By performing this function, the inclusion of the wavelength conditioning element allows for the usable signal spectrum to be extended by more than 100 nm (at times, 130 nm or 140 nm) within the eye-safe 2 µm wavelength region.

In the embodiment of FIG. 1, TDFA 10 takes the form of a multi-stage amplifier consisting of a first, preamplifier stage 12 that is followed by a second, power boosting amplifier stage 14. A wavelength conditioning element, shown in this example as a gain shaping filter (GSF) 16, is disposed along the signal path between first amplifier stage 12 and second amplifier stage 14. Several optical isolators are shown as disposed along the signal path between the input to TDFA 10 and the output from TDFA 10, as well as surrounding GSF 16. While not particularly described or enumerated, it is understood that isolators of this type prevent the propagation of reflections (include pump beams, as discussed below) within the amplifier, where the reflections are known to increase the noise level within the amplifier and diminish the available output power. Similar isolators are illustrated in the various other embodiments as will be discussed in detail below, and perform a similar well-known function.

Figure 2:
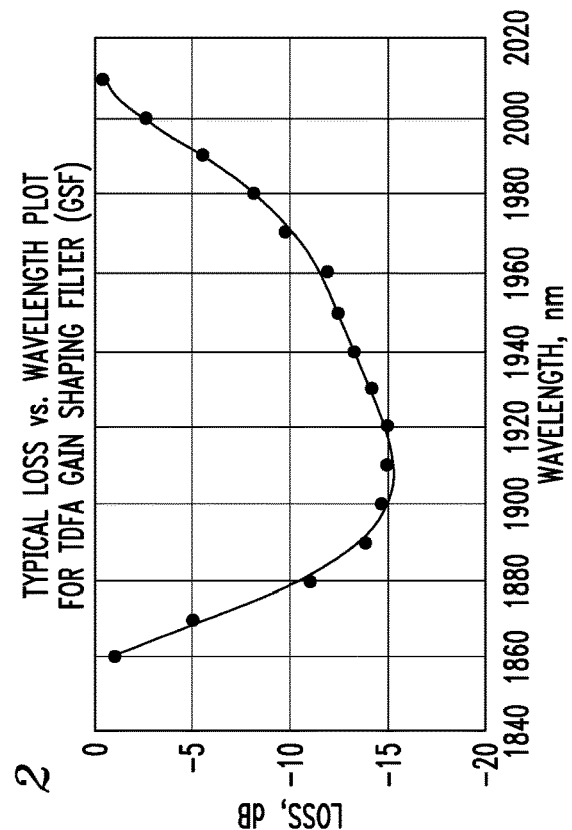
FIG. 2 is a graph of a wavelength response for an exemplary wavelength conditioning element useful in extending the operating bandwidth of an inventive TDFA; that is suitable for flattening the gain/output power from first amplifier stage 12.

FIG. 2 is a graph of an exemplary wavelength response for GSF 16 that is suitable for flattening the gain/output power from first amplifier stage 12. The response shown in FIG. 2 illustrates the type of compensation that may be provided by decreasing the response in the center area of the amplified output signal with respect to the substantially nonuniform responses at either end of the amplifier's spectral bandwidth. As mentioned above, the use of a GSF with such properties has been found to allow for the operating bandwidth of the TDFA to be increased by greater than 100 nm. The specifics of GSF 16 and its used in improving the spectral response of a TDFA will be described in further detail hereinbelow.

Continuing with a description of the remaining elements of TDFA 10 as depicted in FIG. 1, an input optical signal (denoted $S_{IN}$) operating within the eye-safe 2 µm wavelength region is provided as the input signal for TDFA 10. For the sake of explanation, input signal $S_{IN}$ is defined as being a single frequency input, operating at an input wavelength $\lambda_S$ within the general 2 µm band spanning an exemplary range from as low as 1800 nm to upwards of 2090 nm (in various experimental configurations wavelengths of 1909 nm, 1952 nm, and 2004 nm have been studied and have worked well).

Input optical signal $S_{IN}$ is shown in FIG. 1 as passing through an input isolator before being coupled into a signal port of a wavelength division multiplexer (WDM) 20. Pump light $P_1$, operating at a pump wavelength $\lambda_P$ appropriate for creating gain within a Tm-doped optical fiber (e.g., $\lambda_P$=1567 nm), is coupled into a pump port of WDM 20. The output from WDM 20 is thus a combination of both the input signal $S_{IN}$ and pump light $P_1$, where this combination is thereafter applied as an input to first amplifier stage 12; more particularly, coupled into a doped core region of a section of single-clad Tm-doped optical fiber 22 (also referred to at times as "gain fiber"). As well-understood in the art, the presence of light at the wavelength of 1567 nm interacts with the $Tm^+$ ions within the core region of the single-clad fiber to amplify the optical signal that is also propagating through the same fiber. In this particular embodiment, first amplifier stage 12 is configured as a "co-propagating pump" fiber amplifier, with both input signal $S_{IN}$ and pump light Li propagating in the same direction through single-clad Tm-doped gain fiber 22. The amplified output from first amplifier stage 12 is identified as signal $S_{A1}$ in FIG. 1.

Amplified output signal $S_{A1}$ from first amplifier stage 12, referred to at times herein as an "intermediate signal" is shown as passing through an optical isolator before entering GSF 16, where as described above the inclusion of an isolator prevents reflections from re-entering first amplifier stage 12. The operation of an optical isolator does not impact the spectral response of signal $S_{A1}$, which may be relatively nonuniform in terms of gain profile and output power distribution. As mentioned above, the shape of GSF 16 is tailored to reduce wavelength-dependent variations in gain and output power in amplified output signal $S_{A1}$ and provide an extended bandwidth over which suitable operation conditions may be found.

The compensated amplified output from GSF 16, denoted as $S_{A2}$, passes through another isolator and is then provided as an input to second amplifier stage 14, and in particular is coupled to a section of single-clad Tm-doped optical fiber 26. Here, second amplifier stage 14 is configured as a counter-propagating fiber amplifier, meaning that the pump light propagates in the opposite direction as the signal light through gain fiber 26. Referring to FIG. 1, a WDM 28 is shown as disposed beyond the output of gain fiber 26, with a second pump light beam $P_2$ coupled to a pump port of WDM 28 to be directed into the output of gain fiber 26. Regardless of the propagation direction of pump light $P_2$, its presence within the doped core region of gain fiber 26 provides additional amplification to the compensated, amplified signal $S_{A2}$ that is propagating in a forward direction through second amplifier stage 14, creating the amplified output of multi-stage TDFA 10, denoted as $S_{AMP}$. WDM 28 functions in this configuration to pass output signal $S_{AMP}$ along the signal path and through an output isolator before exiting TDFA 10.

In contrast to the use of a co-propagating pump light in first stage 12, the counter-propagating pump light $P_2$ of second amplifier stage 14 interacts with input signal $S_{A2}$ in a very different manner, since the power level of pump light $P_2$ is greatest at the far end of single-clad Tm-doped gain fiber 26 and thereafter diminishes as pump light $P_2$ propagates towards the input end of gain fiber 26 (where the power of the input signal $S_{A2}$ is the greatest). The use of a counter-propagating pump in a fiber amplifier arrangement thus can create similar gain (in terms of magnitude), while also providing greater slope efficiency and power conversion efficiency than the co-propagating embodiment. Power conversion efficiency, defined in this case as the increase in TDFA optical output power as a function of increases in applied pump power, is a particularly important factor to consider when the second amplifier stage is to be used as a power boosting stage.

Continuing with reference to the description of TDFA 10 as shown in FIG. 1, both beams of pump light $P_1$ and $P_2$ are derived from a single pump source 30, as shown. Various embodiments of the present invention may utilize a pump source 30 that is based upon the combination of a discrete, high-power (e.g., multi-watt) semiconductor laser diode 32 and a fiber laser 34, such as illustrated in FIG. 1. In one exemplary embodiment, laser diode 32 may comprise a multi-watt GaAs laser diode emitting at a wavelength $\lambda_{LD}$ of about 940 nm, which is used as a pump input to fiber laser 24 to generate a multi-watt pump output P at a useful pump wavelength $\lambda_P$ of about 1567 nm.

In one exemplary embodiment of pump source 30, fiber laser 34 may comprise a section of Er—Yb co-doped fiber 36, disposed between a pair of reflective surfaces $38_1$, $38_2$ to form a laser cavity. To maintain a compact configuration, the reflective surfaces are preferably formed as a pair of fiber Bragg gratings (FBGs) inscribed directly in fiber 36. The output from laser diode 32 is coupled into fiber laser 34, where this input light operating at a wavelength $\lambda_{LD}$ of about 940 nm resonates within the laser cavity, exciting the Er and Yb ions until reaching a sufficient energy level to be emitted as the pump light P, operating at the pump wavelength $\lambda_P$ of about 1567 nm. The wavelength of 1567 nm is only one of several wavelengths of pump light that are appropriate for use in a Tm-doped gain fiber, and is selected here for explanatory purposes only.

A power splitter 40 is shown in FIG. 1 as disposed at the output of fiber laser 34 and designed to control the fraction of available pump power delivered to each amplifier stage. In arrangements utilizing a combination of a "preamplifier" and a "power boosting" amplifier, power splitter 40 is typically configured to direct most of the pump energy into the power boosting stage. Here, a 20/80 power split is shown and is considered acceptable for this result.

For various applications, it is preferred to use polarization-maintaining (PM) fiber along the signal paths of first amplifier stage 12 and second amplifier stage 14, including the use of PM fiber in the formation of single-clad Tm-doped gain fibers 22 and 26. In particular, when there is a need to provide a consistent state of polarization of a propagating optical signal, the use of PM fiber maintains the orientation of the propagating signal along a designated axis without the need for additional polarization controlling elements. While PM fiber is preferred for use along the signal path, pump source 30 and the pump paths between source 30 and each amplifier stage are generally formed of standard single mode optical fiber.

Referring to the exemplary GSF response shown in FIG. 2, its gain shape is designed to compensate for the nonuniformities in the spectral response of the preceding fiber amplifier (in the case of TDFA 10, first amplifier stage 12). The compensation takes the form of flattening the response such that the gain profile and output power distribution are essentially uniform over the wavelength range of interest. Indeed, it is possible to increase the output power operating bandwidth of TDFA 10 by about 150-170 nm at the 3 dB points (compared to a similar two-stage TDFA not using any type of wavelength conditioning, which has an output power operating bandwidth of about 100 nm). This is a dramatic and significant increase in operating bandwidth that is highly useful in LIDAR, coherent lightwave systems, spectral sensing applications, and WDM optical transmission. While the inclusion of GSF 16 may slightly reduce the maximum signal gain and output power of TDFA 10 (e.g., about 10-15% compared to a directly-coupled two-stage amplifier), the noise figure will not be affected. This tradeoff of much larger operating bandwidth for slightly less signal gain and maximum output power level shows that using wavelength-dependent filtering to condition the spectral response of the amplifier is a significant advance in the state of the art.

Figure 3:
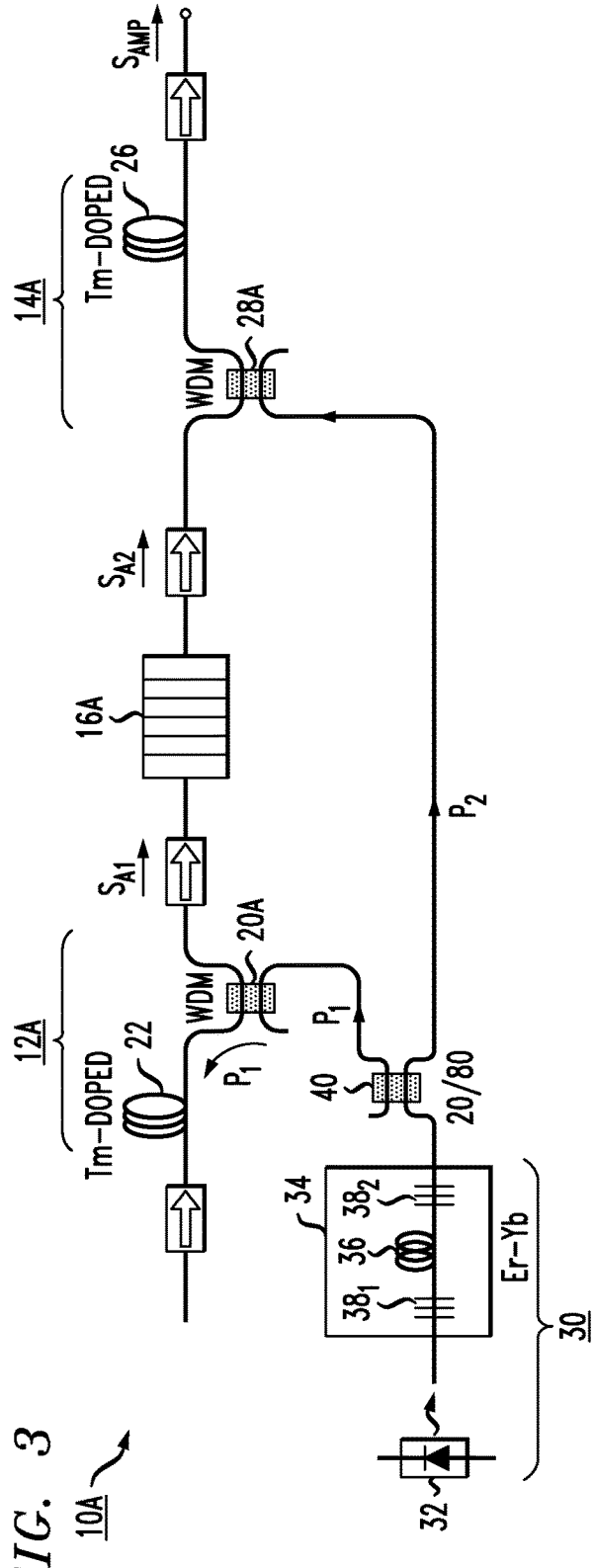
FIG. 3 illustrates an alternative configuration of the embodiment shown in FIG. 1, in this case based on a counter-pumped first amplifier stage and a co-pumped second amplifier stage.

FIG. 3 illustrates an alternative configuration of the embodiment shown in FIG. 1. In this case, a TDFA 10A comprises a counter-pumped first amplifier stage 12A and a co-pumped second amplifier stage 14A. Wavelength conditioning in this case is provided by a GSF 16A that comprises a bulk optic, thin film dielectric filter that is fiber-coupled and disposed between the output of first amplifier stage 12A and second amplifier stage 14A. The specific dielectric materials and thicknesses of each individual layer forming GSF 16A are designed to compensate for the nonuniform emission bandwidth present in the gain profile and output power distribution in the spectral response of first amplifier stage 12A, thereby increasing the bandwidth over which usable values of gain and output power may be found. Other types of gain-shaping filters may be used as element 16A, the selection of a thin film dielectric filter is for explanatory purposes only.

A similar pump source 30 may be used in TDFA 10A, including discrete laser diode 32 and fiber laser 34 to provide pump light to both amplifier stages 12A and 14A through power splitter 40. In this case, a first WDM 20A is positioned at the output of first amplifier stage 12A and is coupled to a section of single-clad Tm-doped gain fiber 22, injecting the first beam of pump light $P_1$ in a counter-propagating direction through gain fiber 22. A second WDM 28A is positioned between the output of GSF 16A and the input of second amplifier stage 14A, and is used to inject the compensated amplified signal $S_{A2}$ and a second beam of pump light $P_2$ into the input of a section of single-clad Tm-doped gain fiber 26 of second amplifier stage 14A. Presuming that power splitter 40 is configured such that the optical power of second pump beam $P_2$ is greater than that of first pump beam $P_1$, second amplifier stage 14A may function as a boosting amplifier, imparting more power into the spectrally-broadened optical signal $S_{A2}$ as it propagates through gain fiber 26, creating amplified output signal $S_{AMP}$. It is to be noted that similar to TDFA 10 of FIG. 1, TDFA 10A may be formed of PM fiber along the signal path.

Figure 4:
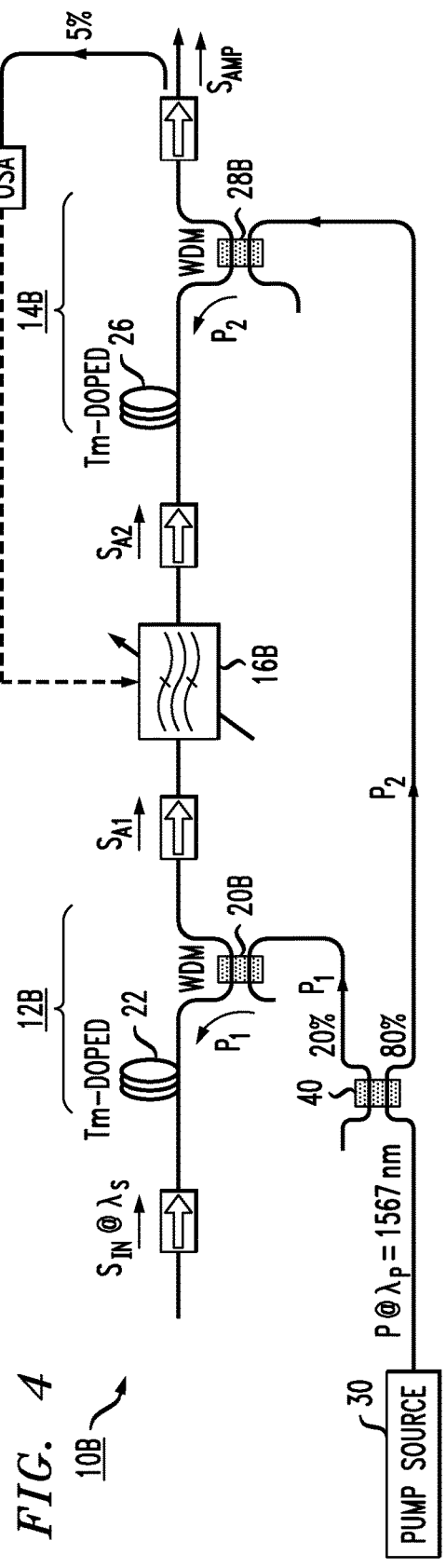
FIG. 4 illustrates an exemplary TDFA formed in accordance with the present invention that is based upon the use of a pair of counter-propagating pump beams.

Besides these two arrangements of pump inputs to the amplifier stages, it is also possible to utilize pump beams that propagate in the same direction through each amplifier stage, that is using a pair of co-propagating pump beams or a pair of counter-propagating pump beams. FIG. 4 illustrates a TDFA 10B based upon the use of a pair of counter-propagating pump beams, with first and second WDMs 20B and 28B disposed at the outputs of first amplifier stage 12B and second amplifier stage 14B, respectively. The inclusion of a GSF 16B between the stages compensates for the spectral response of counter-propagating pumped first stage 12B, where it is to be understood that the spectral response of a counter-propagating pump configuration may be somewhat different than a co-propagating pump arrangement.

As mentioned above, a wavelength conditioning element may be configured as either a passive "static" device (exhibiting a constant wavelength response), or an element may be used that is adjustable as a function of time; that is, as conditions within the amplifier change. TDFA 10B of FIG. 4 is shown as using an active wavelength conditioning element in the form of a tunable GSF 16B. Here, a minimal portion (e.g. about 5% or so) of the amplified output signal $S_{AMP}$ is removed by an optical tap 42 and provided as an input to an optical spectrum analyzer (OSA) 44. OSA 44 functions in a manner well-understood in the art to assess the degree of uniformity being maintained in gain and output power over the wavelength range of interest. Depending on this assessment, there may be a need to adjust the profile of GSF 16B, which may be performed via an applied electrical control signal C, as shown by the dotted line in FIG. 4.

Figure 5:
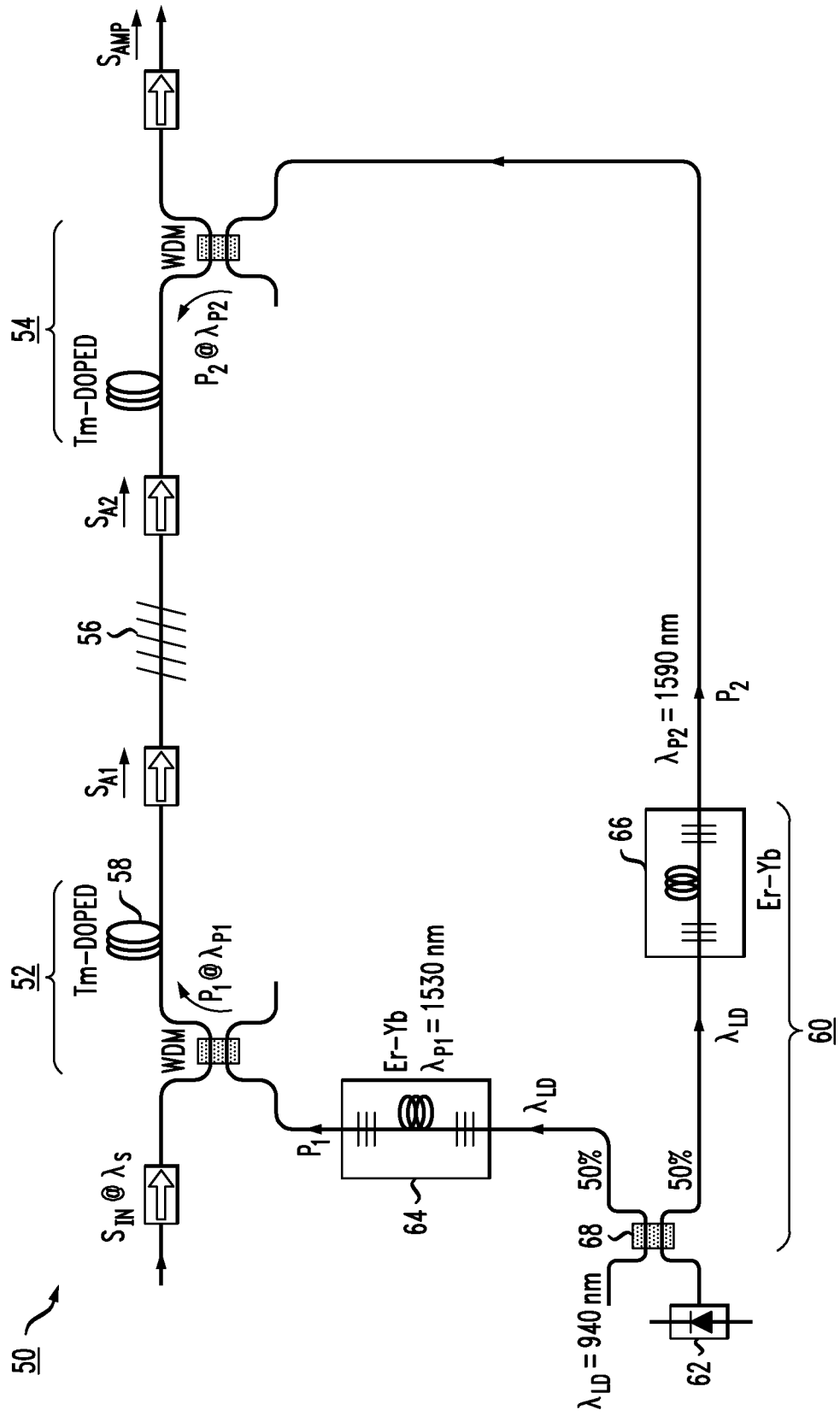
FIG. 5 is a diagram of another embodiment of the present invention, in this case using pump beams operating at different pump wavelengths for each stage of the multi-stage TDFA.

Another embodiment of a wavelength conditioned multistage TDFA is shown in FIG. 5 and denoted as TDFA 50. In this particular embodiment, pump light of different wavelengths is used to provide amplification in each stage of TDFA 50. As shown, pump light $P_1$ at a first pump wavelength $\lambda_{P1}$ is used to provide amplification within a first amplifier stage 52, and pump light $P_2$ at a second pump wavelength $\lambda_{P2}$ is used to provide amplification within a second amplifier stage 54. A wavelength conditioning element in the form of in-line, fiber-based FBG filter 56 is used to flatten the gain and output power responses of first amplifier stage 52 over the bandwidth of interest. In this embodiment of a wavelength condition element, the grating lines of FBG filter 56 are created (i.e. "written") to exhibit a periodicity that will linearize the spectral response of first amplifier stage 52 based on the use of pump light at a wavelength of $\lambda_{P1}$.

In operation, first amplifier stage 52 provides an initial amount of amplification to input signal $S_{IN}$, based upon the specific characteristics of pump beam $P_1$ and single-clad Tm-doped gain fiber 58, creating the initial amplified optical signal $S_{A1}$. After passing through an optical isolator, amplified optical signal $S_{A1}$ Is introduced to FBG filter 56, which has been designed to provide wavelength-based gain and optical output power compensation for the specific spectral response of first amplifier stage 52. In particular, FBG filter 56 creates a flattened, spectrally broadened amplified signal $S_{A2}$, which is thereafter applied as an input to second amplifier stage 54. The ultimate output from second amplifier stage 54, denoted $S_{AMP}$, exhibits additional output power over this extended bandwidth range within the 2 µm wavelength region.

In some configurations of this multi-wavelength TDFA embodiment of the present invention, a single pump source 60 may be used to supply pump beams at both wavelengths $\lambda_{P1}$ and $\lambda_{P2}$ The generation of two different pump wavelengths from laser diode 62 is accomplished in this embodiment by replacing Er—Yb co-doped fiber laser 36 (as found in pump source 30 of TDFA 10 as shown in FIG. 1) with a pair of Er—Yb co-doped fiber lasers 64, 66. As shown in FIG. 5, each Er—Yb co-doped fiber laser is positioned along a separate input pump path. In particular, Er—Yb co-doped fiber laser 64 is shown as disposed along the pump signal path coupled to first amplifier stage 52 and used form a first pump light input $P_{P1}$ at the first pump wavelength $\lambda_{P1}$. Similarly, Er—Yb co-doped fiber laser 66 is disposed along the pump signal path coupled to second amplifier stage 54, providing a pump light input $P_{P2}$ (operating at a different pump wavelength $\lambda_{P2}$) to second amplifier stage 54.

In this design, the use of a first pump beam $P_1$ operating at a pump wavelength $\lambda_{P1}$ shorter than the λP mentioned above (e.g., $\lambda_{P1}$=1530 nm instead of $\lambda_P$=1567 nm), results in a lower absorption of the pump energy by Tm-doped gain fiber 58, leading to a better inversion along the length of gain fiber 58 and an improved gain efficiency with respect to the pump power. In contrast, the use of a second pump beam $P_2$ operating at a pump wavelength $\lambda_{P2}$ (e.g., $\lambda_{P2}$=1590 nm), provides for strong absorption along the gain fiber, thus allowing for a shorter length of fiber to be used to transfer pump energy to the saturating signal. Shorter fiber lengths result in the reduction of non-linear phenomena in second amplifier stage 54, particularly in applications based upon the use of PM fiber.

Continuing with reference to pump source 60, discrete laser diode 62 is used in the same manner as discussed above to provide input pump generation light operating (typically) at $\lambda_{LD}$=940 nm. As shown in FIG. 5, this input pump generation light is subsequently passed through a multimode optical splitter 68, in this case configured to evenly split the optical power along two output paths. Thus, a first portion of the laser diode output is directed into first Er—Yb co-doped fiber amplifier 64 and a second portion of the laser diode output is directed into second Er—Yb coped-fiber amplifier 66.

By controlling the design of the FBGs used to define the lasing cavity within each of these Er—Yb co-doped fiber lasers, each may be adjusted to creating lasing at specific, different suitable pump wavelengths. For example, first Er—Yb co-doped fiber laser 64 may be configured to provide pump light at the wavelength of 1530 nm (i.e., $\lambda_{P1}$=1530 nm). In contrast, the filtering wavelength of the FBGs within Er—Yb co-doped fiber laser 66 may be formed so that this element provides a second pump beam $P_{P2}$ operating a second pump wavelength of $\lambda_{P2}$=1590 nm. The ability to provide different pump wavelengths to separate amplifier stages without requiring separate laser diode sources is considered to be advantageous in size, expense, and flexibility of operation of the inventive TDFA 50 as shown in FIG. 5.

Multi-stage TDFA 50 as shown in FIG. 5 utilizes a co-propagating pump input for first amplifier stage 52 and a counter-propagating pump input for second amplifier stage 54, where this configuration may be particularly well-suited for use with the specific wavelengths selected for $\lambda_{P1}$ and $\lambda_{P2}$. Obviously, other pump schemes may be used, as described in detail above.

While the arrangement of TDFA 50 as shown in FIG. 5 may be advantageous in situations where it desired to use a single (uncooled) laser diode to provide the initial pump beam, it is to be understood that various embodiments of the present invention may use pump sources based upon discrete semiconductor lasers that operate at the specific pump wavelength(s) of interest. FIG. 6 is a block diagram of a multi-stage TDFA 70 formed in accordance with the present invention that utilizes separate pump sources 72 and 74 for each stage of the amplifier. Pump sources 72, 74 may comprise a combination of an uncooled laser diode and fiber laser, as discussed above, or a semiconductor laser diode specifically formed to emit at one of the desired pump wavelengths.

In this specific embodiment, TDFA 70 comprises a first amplifier stage 76 and a second amplifier stage 78, separated by a GSF 80 that is used as a wavelength conditioning element to flatten out (in gain profile and output power) the amplified output signal $S_{A1}$ from first amplifier stage 76. As show, this embodiment utilizes a pair of co-propagating pump beams to create amplification of the input signal propagating as it propagates through both amplifier stages. A first WDM 82 is used to supply both an input optical signal $S_{IN}$ and a first beam of pump light $P_1$ to a section of single-clad Tm-doped gain fiber 84 within first amplifier stage 76, and a second WDM 86 is used to supply both a second beam of pump light $P_2$ and the wavelength-conditioned, amplified signal $S_{A2}$ exiting GSF 80 as the input to second amplifier stage 78. In particular, conditioned signal $S_{A2}$ and pump light $P_2$ are coupled into a section of single-clad Tm-doped gain fiber 88, where the presence of pump light at the wavelength $\lambda_{P2}$ imparts additional amplification to signal $S_{A2}$, generating amplified signal $S_{AMP}$ as the output of TDFA 70.

FIG. 7 illustrates an exemplary multi-stage TDFA 90 that is particularly configured to provide amplification and wavelength conditioning for a pulsed input signal. As with the arrangements described above, TDFA 90 includes a first amplifier stage 92 and a second amplifier stage 94 separated by a wavelength conditioning element 96. In this case, wavelength conditioning element 96 comprises a combination of a circulator 98 and a narrowband, reflective FBG 100. Reflective FBG 100 is formed to have a center wavelength that matches the wavelength $\lambda_s$ of input signal $S_{P\_IN}$, and an extremely narrowband bandwidth (on the order of 1 nm or less) to remove a significant majority of the ASE in the amplified output $S_{P\_A1}$ from first amplifier stage 92. While TDFA 90 is shown as using an arrangement such as pump source 30 to provide pump beams to each amplifier stage, it is to be understood that various other pump arrangements may be used. Additionally, while the arrangement of TDFA 90 is shown as including a co-propagating pump input in first amplifier 92 and a counter-propagating pump input in second amplifier stage 94, any of the other pump configurations described above may also be used with a pulsed input signal.

Continuing with a description of TDFA 90, a pulsed input signal $S_{P\_IN}$ is shown as passing through an input isolator 102 and then coupled to an input signal port of a first WDM 104. A first beam of pump light $P_1$ is coupled to a second input port of first WDM 104, with their combination then coupled into first amplifier stage 92. As with the arrangements described above, the train of pulses forming input signal $S_{P\_IN}$ is applied as an input to a section of single-clad Tm-doped gain fiber 106. The presence of pump light at an appropriate wavelength $\lambda P$ amplifies each pulse as it propagates along the length of gain fiber 106, creating an initially amplified pulse train $S_{P\_A1}$ at the output.

While pulsed input signal $S_{P\_IN}$ (operating at wavelength $\lambda_s$) is amplified within first amplifier stage 92, broadband spontaneous emission in a region surrounding this wavelength is also present in the amplified output from first amplifier stage 92. Wavelength conditioning element 96 is thus used in this embodiment of the present invention to remove a substantial portion of this background emission and provide a "clean" amplified pulse train $S_{P\_A2}$ as the input to second amplifier stage 94.

In this specific configuration of FIG. 7, the output from first amplifier stage 94 is coupled into a first port A of optical circulator 98. A reflective narrowband FBG 100 (with a center wavelength $\lambda_s$) is coupled to a second port B of optical circulator 98. The amplified output from first amplifier stage 92 exits circulator 98 at port B, passes a first time through FBG 100 and is then reflected to pass a second time through the same FBG. Upon its return, the filtered pulse train re-enters second port B of optical circulator 98 and propagates within optical circulator 98 until reaching a third port C, which is used as the output port of optical circular 98, directing the amplified, filtered pulse train into second amplifier stage 94. The power boosting efficiency of second amplifier stage 94 is thus improved over prior art amplifiers, since the optical input signal contains energy only within an extremely narrow band surrounding the wavelength of the pulse.

In this particular embodiment, pump beam $P_2$ is applied as a counter-propagating pump wave to a section of single-clad Tm-doped fiber 108 within second amplifier stage 94. A second WDM 110, as shown, is used to provide pump light $P_2$ to gain fiber 108, as well as direct the amplified stream of output pulses, denoted $S_{P\_AMP}$ out of TDFA 90.

Figure 8:
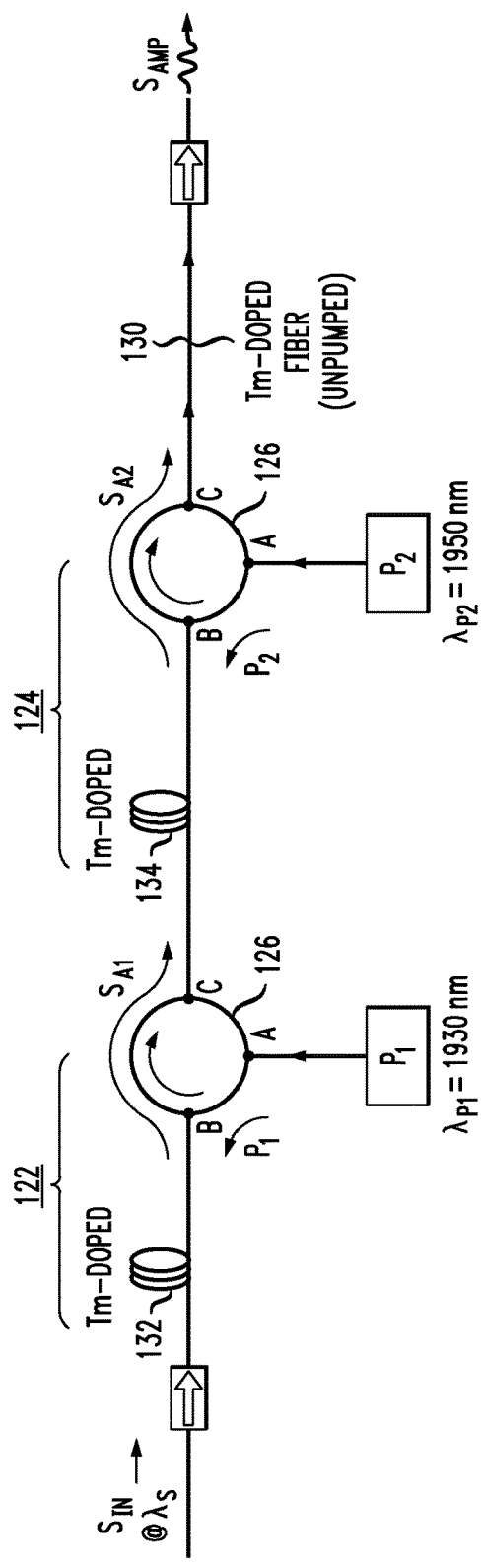
FIG. 8 depicts another embodiment of the present invention, in this case using optical circulators to provide a propagating input signal and pump beams to each stage of the multi-stage TDFA.

Besides forming part of a wavelength conditioning element, optical circulators may be used in various embodiments of the present invention as an alternative arrangement for providing the propagating optical signal and pump beams to each amplifier stage. FIG. 8 illustrates an exemplary multi-stage TDFA 120 that utilizes optical circulators in this manner. In keeping with the alternative pump wavelength selection for this embodiment (as compared to those described above), TDFA 120 is defined as using "in-band" pumping. In particular, TDFA 120 is shown as comprising a first amplifier stage 122 and a second amplifier stage 124, with a first optical circulator 126 used to provide both the optical input signal $S_{IN}$ and a first pump beam $P_1$ as inputs to first amplifier stage 122 and a second optical circulator 128 used to provide an amplified optical signal $S_{A1}$ and a second pump beam $P_2$ as inputs to second amplifier stage 124. In this particular arrangement, a wavelength conditioning element in the form of a GSF 130 is disposed beyond the output of second amplifier stage 124. However, it is to be understood that a wavelength conditioning element may also be positioned at an intermediate location (i.e., between amplifier stages), as discussed above in association with various other embodiments.

In this exemplary embodiment, GSF 130 may take the form of an un-pumped section of Tm-doped optical fiber, which exhibits a nonuniform characteristic that may be further modified (e.g., by modifying the length of the fiber, or changing the Tm dopant concentration in the core of the fiber) to provide the desired amount of wavelength conditioning. Inasmuch as both pump beams are counter-propagating in the arrangement of TDFA 120, there should be no pump light that is introduced into this section of Tm-doped optical fiber, since it is positioned beyond second amplifier stage 124. Obviously, other types of wavelength conditioning elements may be used, such as the discrete thin film dielectric filter, or fiber-based FBG as discussed above.

As with optical circulator 98 described above, optical circulators 126, 128 are defined as including a set of three ports, denoted "A", "B", and "C". In this case, port A is used as a "pump input", port B is used as a "pump output"/ "amplified signal input" port, and port C is used as the output port of the amplified signal. First pump beam $P_1$ is shown as entering port A of optical circulator 126, and thereafter exiting at port B to propagate through a first section of single-clad Tm-doped gain fiber 132 of first amplifier stage 122. Input signal $S_{IN}$, interacting with this counter-propagating pump light, creates first amplified signal $S_{A1}$, which is shown as provided as an input at port B of optical circulator 126. Amplified signal $S_{A1}$ thereafter exits optical circulator 126 at port C, which is coupled to second amplifier stage 124 and, more particularly, to a section of single-clad Tm-doped gain fiber 134 (it is to be noted that there is no need to include an optical isolator between stages by virtue of using uni-directional optical circulators).

The second pump beam $P_2$ is shown as coupled into port A of second optical circulator 128, where it is thereafter directed out of port B so as to propagate through Tm-doped fiber 134 and interact with amplified signal $S_{A1}$ to create the output amplified signal $S_{AMP}$. In accordance with this embodiment of the present invention, the amplified signal $S_{AMP}$ exiting Tm-doped fiber 134 is coupled into port B of second optical circulator 128, and travels through circulator 128 to exit at port C, where in this particular embodiment it then passes through a defined length of unpumped Tm-doped optical fiber 130 (used to flatten the gain and output power spectral responses) before passing through output isolator 19 and exiting TDFA 120.

Figure 9:
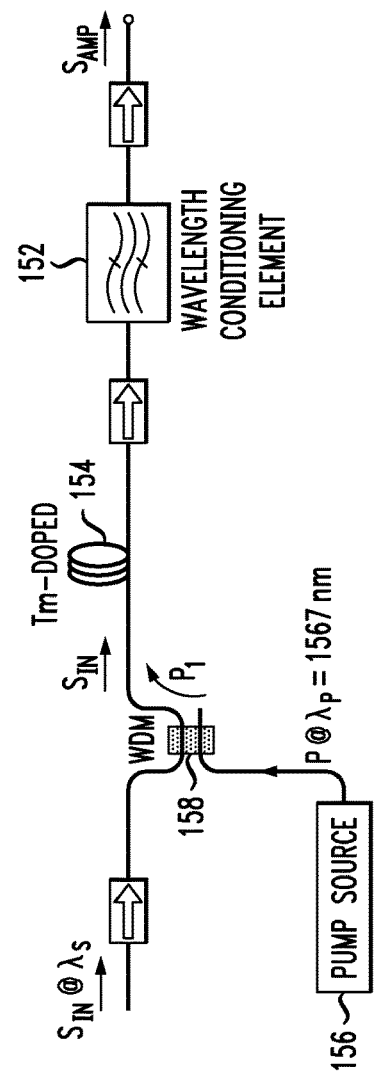
FIG. 9 is a diagram of a single-stage TDFA formed to include a wavelength conditioning element in accordance with the present invention.

Wavelength conditioning in accordance with the principles of the present invention may be utilized within TDFAs having any number of individual amplifier stages in order to provide an amplified output that is relatively broadband in terms of providing acceptable levels of both gain and output power. FIG. 9 illustrates an exemplary single-stage TDFA 150 that includes a wavelength conditioning element 152 for broadening the useable bandwidth of the amplifier in accordance with the principles of the present invention. TDFA 150 is shown as comprising a section of single-clad Tm-doped gain fiber 154, with a pump source 156 used to provide a pump beam P at an appropriate wavelength $\lambda_P$ to generate amplification of an optical signal $S_{IN}$ propagating through gain fiber 154. Pump source 156 may comprise a discrete laser diode configured to operate at the desired pump wavelength $\lambda_P$, a combination of an input laser diode and fiber laser (as discussed in detail above), or any other suitable configuration for providing pump light to the gain fiber.

The specific arrangement shown in FIG. 9 is a co-propagating pump configuration, where input signal $S_{IN}$ is shown as passing through an input isolator before being combined with pump light P within a WDM 158 such that both the input signal and pump light are coupled into the Tm-doped core region of single-clad Tm-doped gain fiber 154. Wavelength conditioning element 152 may comprise any of the specific gain shaping filters described above, or other appropriate filtering elements configured to compensate for the nonuniformities in the amplified output from gain fiber 154.

Figure 10:
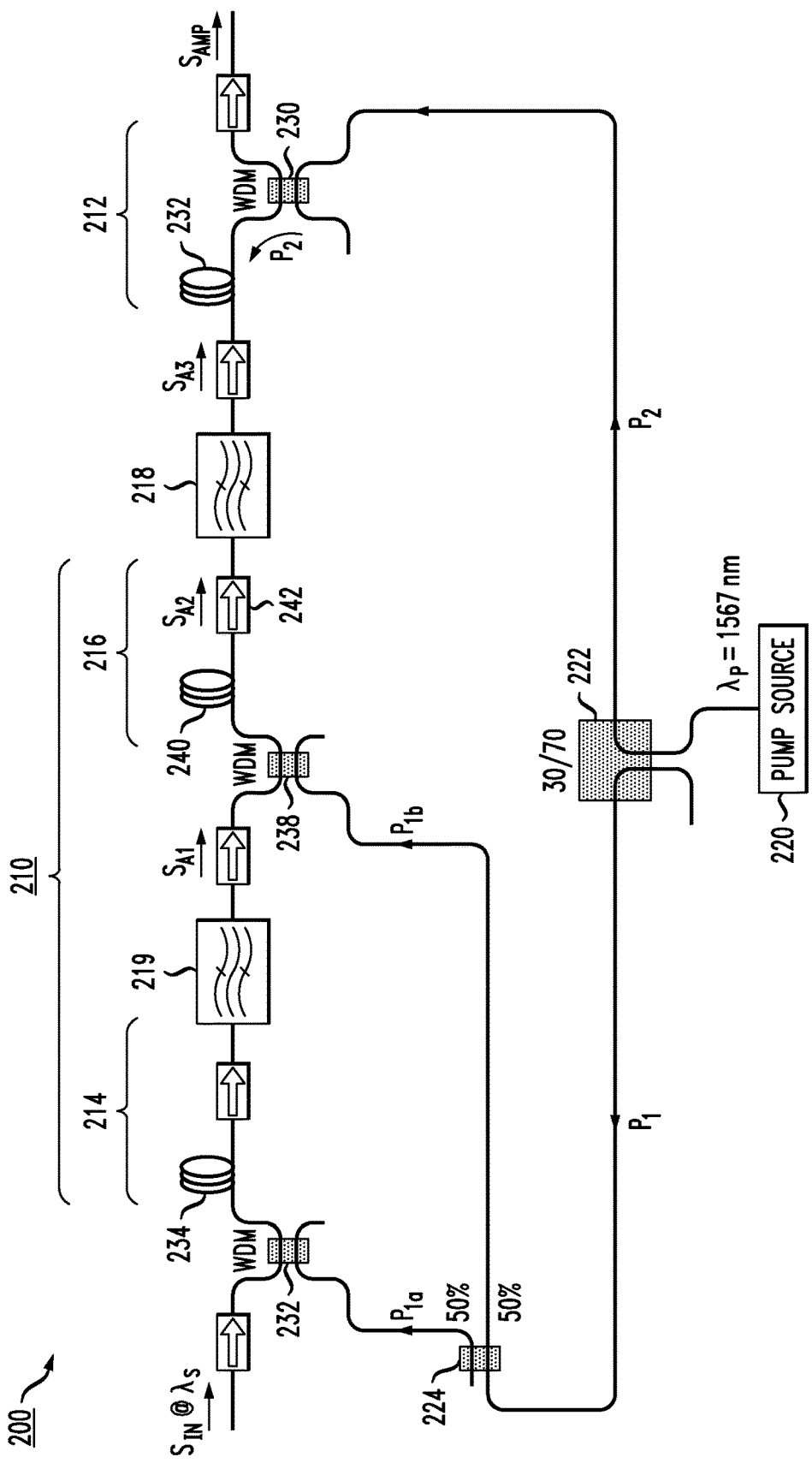
FIG. 10 is a diagram of a three-stage TDFA formed in accordance with the present invention.

FIG. 10 is a block diagram of a three-stage TDFA 200 formed in accordance with the present invention to utilize wavelength conditioning to extend the bandwidth over which the amplifier maintains a relatively uniform gain profile and output power distribution. The particular arrangement shown in FIG. 10 comprises a pre-amplifier 210 and a power amplifier 212, where pre-amplifier 210 is formed of a pair of amplifier stages 214, 216, and power amplifier 212 is configured as a single amplifier stage. The use of a two-stage pre-amplifier 210 is considered to be appropriate in applications based upon the use of a long wavelength input (e.g., >2040 nm) so that a sufficient amount of gain is provided prior to wavelength conditioning and amplification by power amplifier 212. A wavelength conditioning element in the form of a GSF 218 is positioned at an intermediate location between pre-amplifier 212 and power amplifier 214 and used in the manner described above to flatten the spectral response of pre-amplifier 210 (as well as extend its operating bandwidth) prior to introducing the signal to power boosting amplifier stage 214. If desired, a second GSF 219 may be disposed between the pair of pre-amplifier stages, allowing for efficient gain spectrum equalization in an efficient manner by configuring the pair of GSFs to tailor filter responses to the response of the individual amplifier stages.

In this particular embodiment, a single pump source 220 is used to provide pump beams to each of the individual amplifier stages forming three-stage TDFA 200. In this case, each stage uses the same pump wavelength $\lambda_P$, and a pair of power splitters 222, 224 is used to divide the pump light into separate beams of appropriate power level for each amplifier stage. First power splitter 222 is shown as receiving the input pump beam (shown here as produced by a fiber laser within pump source 220) and directing a first pump beam $P_1$ toward pre-amplifier 210 and a second pump beam $P_2$ toward power amplifier 212. While a majority of the pump energy is directed into power amplifier 212, a significant fraction of the available pump power is also necessary to support the operation of both pre-amplifier stages 214 and 216. For example, it has been found that a 30/70 power splitter may be preferred for this three-stage TDFA, as compared to the use of a 20/80 power splitter in the two-stage embodiments discussed above.

Power amplifier 212 is depicted in this particular example as using a counter-propagating pump beam, with a WDM 230 disposed beyond the output of a section of single-clad Tm-doped optical fiber 232 used in forming power amplifier 212. The larger-power portion of pump light $P_2$ is shown as provided as an input to WDM 230 so as to enter gain fiber 232 and provide amplification to the optical signal passing through power amplifier 212.

Turning to pre-amplifier 210, second power splitter 224 is shown as used to divide this smaller-power portion of pump beam $P_1$ into two separate output pump beams of substantially equal power (i.e., a 50/50 splitter). A first pump beam $P_{1a}$ is combined with input signal $S_{IN}$ within a WDM 232, with their combination then coupled into a section of single-clad Tm-doped optical fiber 234 within first amplifier stage 214. The amplified output from first amplifier stage 214 then passes through an optical isolator before being applied as an input to a WDM 238. As shown, the remaining portion of the pre-amplifier pump beam $P_{1b}$, is applied to the pump input port of WDM 238, so that the combination of the initially-amplified optical signal and the second pump beam are coupled into a section of single-clad Tm-doped optical gain fiber 240 of second amplifier stage 216.

The amplified output signal from second amplifier stage 216, denoted $S_{A1}$, is therefore the output from pre-amplifier 210, and is likely to exhibit nonuniformities in its spectral response, as discussed above. After passing through an optical isolator 242, amplified signal SA1 is applied as an input to GSF 214. Similar to the configurations described above, GSF 214 is particularly configured to equalize the gain profile and output power of SA1 across a particular wavelength range of interest for a given application.

While certain preferred embodiments of the present invention have been illustrated and described in detail, it should be apparent that modifications and adaptations to those embodiments may occur to one skilled in the art without departing from the scope of the present invention as set forth in the claims appended hereto. Indeed, the described embodiments are to be considered in all respects as only illustrative and not restrictive.

What is claimed is:

1. A multi-stage optical amplifier for operation at an eye-safe input optical signal wavelength $\lambda_s$ within the 2 μm wavelength region, comprising:
   a plurality of N sections of single-clad Tm-doped optical fiber disposed in a concatenated configuration, each section defining a separate stage of the multi-stage optical amplifier, wherein an input optical signal is coupled into a first, input amplifier stage of the multi-stage optical amplifier and an amplified output signal exits from a last, output amplifier stage of the multi-stage optical amplifier;
   a pump source providing a pump beam to each separate amplifier stage of the multi-stage optical amplifier; and
   a wavelength conditioning element disposed along a signal path at an input to another amplifier stage of the multi-stage optical amplifier, the wavelength conditioning element responsive to an intermediate amplified optical signal and configured to normalize a gain profile and an output power distribution of the intermediate amplifier signal across a predetermined wavelength region, increasing an operating bandwidth of the intermediate amplified optical signal to a value of at least 100 nm prior to propagating through the last, output amplifier stage of the multi-stage optical amplifier.

2. The multi-stage optical amplifier as defined in claim 1 wherein the wavelength conditioning element comprises a gain shaping filter.

3. The multi-stage optical amplifier as defined in claim 2 wherein the gain shaping filter comprises an active gain shaping filter.

4. The multi-stage optical amplifier as defined in claim 2 wherein the gain shaping filter is selected from the group consisting of: thin-film dielectric filters, fiber Bragg gratings, acousto-optic filter components, electro-optic filter components, MEMs devices, and liquid crystal devices.

5. The multi-stage optical amplifier as defined in claim 1 wherein the wavelength conditioning element comprises;
   an optical circulator disposed at the input of the last, output amplifier stage, where the intermediate amplified signal is coupled into a first port of the optical circulator; and
   a reflective narrowband Bragg grating centered at the operating wavelength $\lambda_s$ coupled to a second port of the optical circulator such that the intermediate amplified signal interacts with the reflective narrowband Bragg grating as it propagates through the optical circulator, presenting a filtered, amplified optical signal as an output at a third port of the optical circulator, the filtered, amplified optical signal provided as the input to the last, output amplifier stage.

6. The multi-stage optical amplifier as defined in claim 1 wherein the pump source comprises a plurality of N separate pump beam sources, each coupled to a separate one of the plurality of N amplifier stages.

7. The multi-stage optical amplifier as defined in claim 6 wherein at least two of the plurality of N separate pump beam sources operate at different pump wavelengths useful in producing gain in the presence of Tm ions.

8. The multi-stage optical amplifier as defined in claim 1 wherein the pump source comprises;
   a single lasing component; and
   a 1:N power splitter for providing a separate pump beam as an input to each separate amplifier stage of the plurality of N amplifier stages.

9. The multi-stage optical amplifier as defined in claim 8 wherein each amplifier stage operates at a same pump wavelength $\lambda_P$.

10. The multi-stage optical amplifier as defined in claim 9 wherein the single lasing component comprises;
    an input laser diode operating at a predetermined wavelength $\lambda_{LD}$ to provide a pump input beam; and
    a fiber laser disposed to receive the pump input beam and generate therefrom a pump beam operating at the pump wavelength $\lambda_P$.

11. The multi-stage optical amplifier as defined in claim 8 wherein at least two amplifier stages operate at different pump wavelengths $\lambda_{P1}$, $\lambda_{P2}$, the pump source further comprising
    a separate fiber laser disposed along at least two output signal paths from the 1:N power splitter, each separate fiber laser configured to generate one of the different pump wavelengths.

12. The multi-stage optical amplifier as defined in claim 1 wherein at least one amplifier stage is configured as a co-propagating pump amplifier stage.

13. The multi-stage optical amplifier as defined in claim 1 wherein at least one amplifier stage is configured as a counter-propagating pump amplifier stage.

14. The multi-stage optical amplifier as defined in claim 1 wherein the last, output amplifier stage comprises a power boosting optical amplifier, using a multi-watt pump input.

15. The multi-stage optical amplifier as defined in claim 8 wherein the last, output amplifier stage comprises a power boosting amplifier stage and the 1:N power splitter is configured to provide a majority of the input pump power to the power boosting amplifier stage.

16. The multi-stage optical amplifier as defined in claim 1 wherein the plurality of N sections of single-clad Tm-doped optical fiber comprise sections of polarization-maintaining, single-clad Tm-doped optical fiber.

17. An optical amplifier for operation at an eye-safe input optical signal wavelength $\lambda_s$ within the 2 μm wavelength region, comprising:
- a section of single-clad Tm-doped optical fiber, receiving as an input an optical input signal propagating at $\lambda_s$;
- a pump source coupled to the section of single-clad Tm-doped optical fiber for providing a pump beam at a predetermined pump wavelength $\lambda_P$, the pump beam interacting with the propagating optical input signal to generate an intermediate amplified output signal; and
- a wavelength conditioning element coupled to the output of the section of single-clad Tm-doped optical fiber, the wavelength conditioning element responsive to the intermediate amplified optical signal and configured to normalize a gain profile and an output power distribution of the intermediate amplifier signal across a predetermined wavelength region, increasing an operating bandwidth of the intermediate amplified optical signal to a value of at least 100 nm to provide a broadband amplified output signal of the optical amplifier.

18. The optical amplifier as defined in claim 17 wherein the wavelength conditioning element comprises a gain shaping filter.

19. The optical amplifier as defined in claim 18 wherein the gain shaping filter comprises a wideband Bragg grating formed in a section of optical fiber.

20. The optical amplifier as defined in claim 18 wherein the gain shaping filter comprises a section of un-pumped, single-clad Tm-doped optical fiber.

* * * * *